3,627,496
IMPINGEMENT PLATE FOR CRYSTALLIZER
John A. Hermann, Carlsbad, N. Mex., assignor to
Kerr-McGee Corporation
Filed July 29, 1968, Ser. No. 748,448
Int. Cl. B01d 9/02
U.S. Cl. 23—273 R                4 Claims

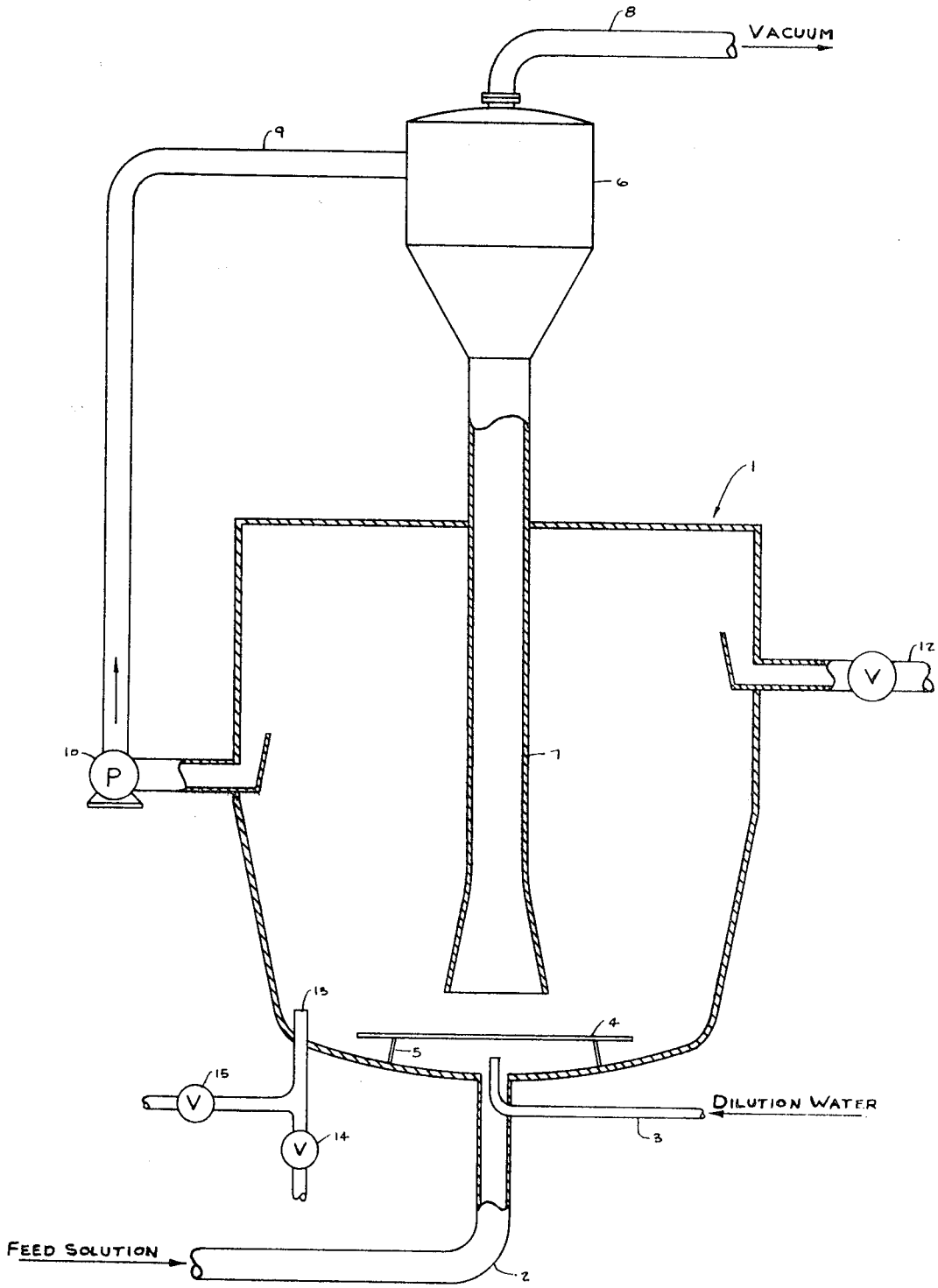

ABSTRACT OF THE DISCLOSURE

Crystallizing apparatus having a recirculation circuit including an evaporator and a downcomer conduit leading from the evaporator to the body of the crystallizing vessel. An impingement plate is provided between the outlet end of the downcomer conduit and the bottom wall of the crystallizing vessel, and the temperature of the impingement plate is maintained slightly higher than that of the solution coming from the downcomer conduit to prevent crystal formation and buildup.

BACKGROUND OF THE INVENTION

This invention relates to apparatus for producing crystals, such as of inorganic salts, from solutions. More specifically, this invention relates to an improvement in apparatus for producing crystals from solutions, which apparatus includes a crystallizing body in which a bed of growing crystals is maintained, and a recirculation circuit including an evaporator and a downcomer conduit.

Crystallizers which include the above-mentioned features are well-known in the art, and have been used commercially in various applications for many years. For example, several such crystallizers may be used in series to crystallize potassium chloride from a hot aqueous solution saturated with potassium chloride and sodium chloride. As is well-known, upon cooling such a solution, the potassium chloride will crystallize out selectively. This is because in such a system, the solubility of potassium chloride decreases with a decrease in temperature, whereas the solubility of sodium chloride does not. In operating crystallizers in this way, the hot solution is cooled step-wise from one crystallizer to the next, with a portion of the potassium chloride in the solution recovered from each crystallizer. A stream of brine is advanced continuously from each crystallizer to the next one in the series, until the brine has been cooled to near ambient temperature, at which point it is discarded or reheated and used to leach additional potassium chloride from ore. Within each crystallizer in the series, a stream is withdrawn from the main body of the crystallizer, passed to an evaporator, and then returned to the main body of the crystallizer through a downcomer conduit extending from the evaporator. Generally, the advancing stream which is withdrawn from one of the crystallizers and passed to the next one in the series is added to the recirculating stream of the downstream crystallizer so that it enters the body of the unit by way of the evaporator and downcomer. The withdrawn stream, which is at or near saturation, is cooled and concentrated by the operation of the evaporator, and as a result it is generally slightly supersaturated upon leaving the evaporator section. In practice, the amount of supersaturation may be from two to five degrees Fahrenheit. As a result of this supersaturation, there is a tendency for the potassium chloride to deposit out on any surface with which it comes in contact. These deposits tend to grow, and eventually break off and interfere with the normal flows in the unit, and tear the linings in cases where the downcomer and/or the crystallizer body are lined with rubber or other soft material.

Several approaches have been tried in an attempt to solve the problem of crystal deposits on these surfaces, which deposits necessitate periodic shutting down of the unit for cleaning out.

One such approach involves using a smooth, highly-polished material for the surfaces, since it is known that deposits are less likely to occur on a very smooth surface. This is beneficial to some extent, but does not solve the problem completely. In addition, the nature of the environment (hot, saturated brines) limits the selection of materials.

Another approach was to cover the surfaces with a pulsating rubber liner which operated in much the same way as the pulsating de-icing equipment used on the leading edges of some aircraft surfaces. This was also helpful to some extent, but did not provide a really satisfactory solution to the problem of crystal buildup.

SUMMARY OF THE INVENTION

According to the present invention, an impingement plate is provided between the outlet of the downcomer conduit from the evaporator and the bottom wall of the crystallizer body. This impingement plate is maintained at a slightly higher temperature than that of the recirculating stream coming from the downcomer. This reduces or eliminates the tendency of the slightly supersaturated solution to deposit crystals on the surface of the impingement plate, with resulting buildup of crystals and interference with flow through the unit, and eventual shut down for washing out.

The impingement plate can be heated above the temperature of the recirculating stream by any of several methods, but preferably is heated by the advancing solution from the upstream crystallizer. This is accomplished by feeding the advancing solution through the bottom of the crystallizer body and against the bottom side of the impingement plate. The impingement plate is mounted so that there is an opening between the plate and the bottom wall of the crystallizer body. Preferably the opening is uniform about the periphery of the plate. The advancing stream from an upstream crystallizer by its nature is slightly hotter than the solution circulating through the next unit. In order to avoid crystal deposits on the lower side of the impingement plate (where the advancing stream contacts a surface cooler than the stream), a small amount of fresh or unsaturated water can be blended into the advancing stream near the inlet to the crystallizer body. However, this is not generally necessary unless the advancing stream is slightly supersaturated.

BRIEF DESCRIPTION OF THE DRAWING

The accompanying drawing is a sectional elevation of a crystallizer unit illustrating the invention.

DESCRIPTION OF THE PREFERRED EMBODIMENT

According to a preferred embodiment of the invention, as illustrated in the drawing, a crystallizer 1 is shown with a feed pipe 2 for conducting a hot saturated or nearly saturated brine, either from a leaching operation or from another crystallizer upstream from the crystallizer 1. The hot brine from feed pipe 2 enters the crystallizer 1 through its bottom wall and impinges onto the bottom surface of impingement plate 4. A dilution pipe 3 is used to assure that the feed stream does not crystallize out on the cooler surface of impingement plate 4, which is mounted to the bottom of crystallizer 1 by supports 5, which may be adjustable as to height. The plate 4 is mounted with respect to the bottom of crystallizer 1 so that there is an opening between the plate and the bottom of the crystallizer about the periphery of the plate.

Mounted on crystallizer 1 is an evaporator 6 including a downcomer conduit 7 extending into the body of crystallizer 1. An exhaust pipe 8 is connected to a source of vacuum (not shown). A conduit 9 conducts a recirculating stream of solution from the crystallizer to the evaporator by means of a pump 10. Conduit 12 conducts a discharge stream from the crystallizer, either to the next downstream unit in the series of crystallizers, or to a discard or leaching step.

The crystallizer will have a bed of growing crystals in the crystallizing solution 11, and product drawoff tap 13, controlled by outlet valve 14 and elutriation valve 15, serves to withdraw product crystals of a predetermined size from the crystallizing solution.

To illustrate the advantages to be obtained from the use of the invention, a commercial crystallizer was operated for several months in a conventional manner during which a saturated solution of potassium chloride and sodium chloride at about 214° F. was fed into the crystallizer through the recirculation conduit, passing to the evaporator and then to the crystallizer body through the downcomer. The solution was slightly supersaturated as it left the downcomer, due to concentration in the evaporator. A crystal buildup occurred on the bottom of the crystallizer where the flow from the downcomer was directed, disrupting the circulation through the crystallizer and resulting in a shutdown for purposes of cleaning out the crystal buildup an average of once evry 83 hours.

The crystallizer was then modified by installing an impingement plate between the bottom of the crystallizer and the downcomer outlet, and the feed conduit to the unit was changed from the recirculation leg to the bottom of the crystallizer, so that the hot incoming feed impinged against the plate, warming it so that the solution from the downcomer no longer was directed against a surface cooler than the solution. An immediate improvement (decrease) in the rate of crystal buildup was noticed, and the time between shutdowns for cleanout of crystal buildup increased to an average of 292 hours. The amount and quality of product crystals was as good or better than when operating in a conventional manner, so that the overall operation in accordance with the invention is clearly superior, particularly with regard to time interval between washouts.

I claim:

1. In a crystallizer unit having a crystallizing vessel for maintaining a bed of growing crystals therein, a feed inlet, means for withdrawing solution from the vessel, means for recirculating at least a portion of the withdrawn solution back to the crystallizing vessel through an evaporator and a downcomer conduit extending therefrom into the crystallizing vessel, the improvements comprising
   an impingment plate, having at least two outer surfaces, disposed between the outlet of the downcomer conduit and the bottom portion of the crystallizer vessel in axial alignment with the downcomer outlet, one of said surfaces being substantially perpendicular to the flow of solution from the downcomer and positioned to provide an opening between the periphery of the plate and the bottom portion of the crystallizer vessel; and
   said feed inlet being arranged to direct the feed solution into the crystallizer unit from below and against the opposite surface of the impingement plate and having means to maintain the temperature of the surface of the impingement plate facing the outlet of the downcomer conduit slightly higher than the temperature of the recirculating solution flowing out of the downcomer conduit.

2. A crystallizer unit as claimed in claim 1 in which the feed inlet of the crystallizer unit is arranged to direct feed solution into the crystallizer unit substantially perpendicularly to the opposite surface of the impingement plate.

3. A crystallizer unit as claimed in claim 2 in which means are provided for adding dilution water to the feed inlet near the location where the feed inlet joins the crystallizer vessel.

4. In a method of operating a crystallizer unit including maintaining a bed of growing crystals in a crystallizing vessel, withdrawing solution from the crystallizing vessel and circulating at least a portion of the withdrawn solution to an evaporator and then to a downcomer conduit extending into the crystallizing vessel, the improvements comprising:
   (a) discharging the solution from the downcomer conduit against an impingement plate in axial alignment with the downcomer conduit, said impingement plate having at least two surfaces, said discharge impinging substantially perpendicularly against one of said surfaces;
   (b) maintaining the temperature of said surface of the impingement plate slightly higher than the temperature of the solution discharging from the downcomer conduit by impinging a feed solution against the opposite surface of the impingement plate.

References Cited

UNITED STATES PATENTS

| 2,567,968 | 9/1951  | Saeman  | 23—273 |
| 2,645,560 | 7/1953  | Otto    | 23—273 |
| 2,811,424 | 10/1957 | Ackeren | 23—273 |
| 3,218,133 | 11/1965 | Ebner   | 23—273 |
| 3,292,999 | 12/1966 | Chirico | 23—273 |
| 3,208,834 | 9/1965  | Schulze | 159—45 |

NORMAN YUDKOFF, Primary Examiner

S. SILVERBERG, Assistant Examiner

U.S. Cl. X.R.

23—301 R